March 22, 1955
F. WALTHER
2,704,473
TOOL WITH LOST MOTION CONNECTION FOR
DRIVING SELF-TAPPING INSERTS
Filed July 22, 1952
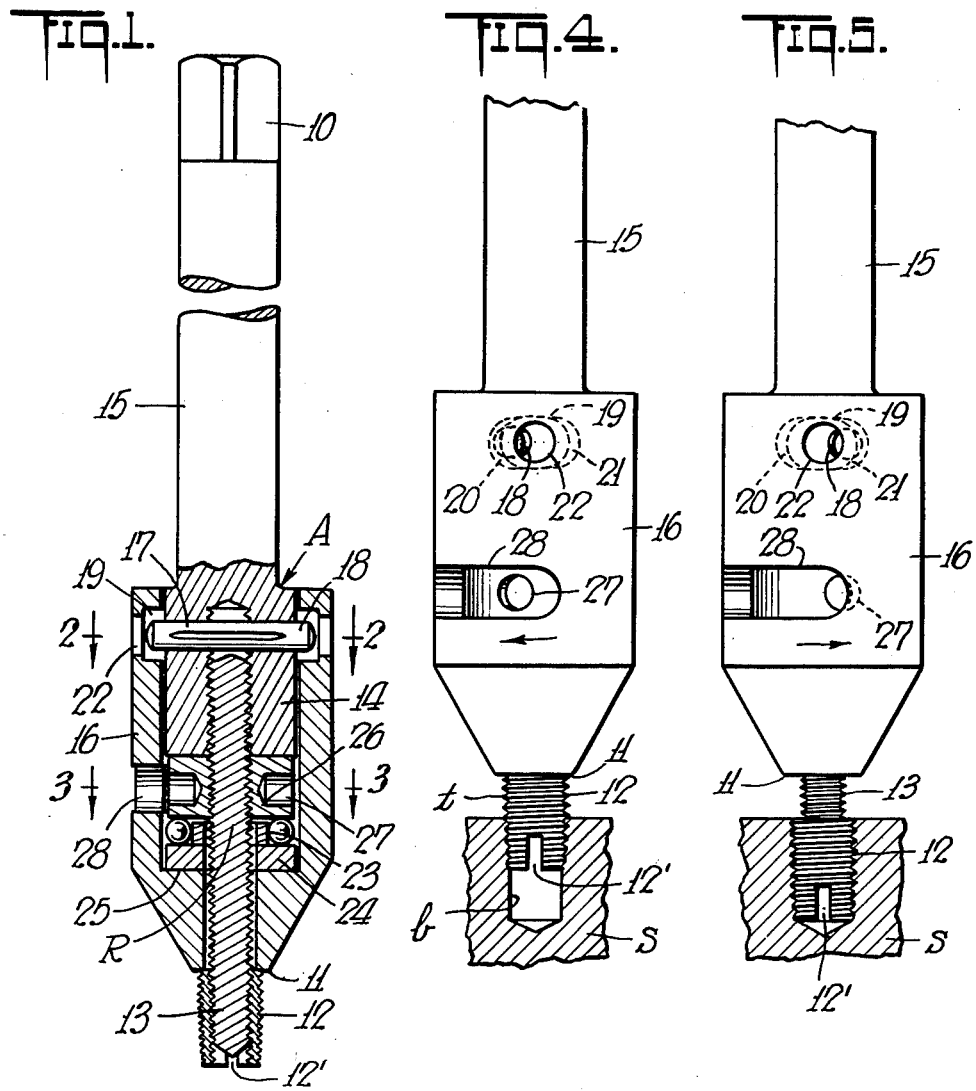
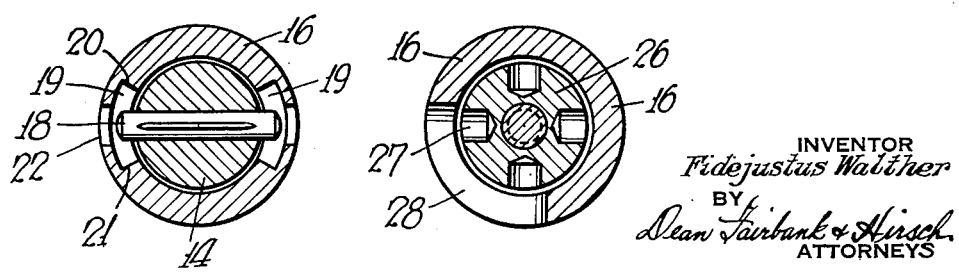
INVENTOR
Fidejustus Walther
BY
Dean Fairbank & Hirsch
ATTORNEYS United States Patent Office 2,704,473
Patented Mar. 22, 1955

2,704,473

TOOL WITH LOST MOTION CONNECTION FOR DRIVING SELF-TAPPING INSERTS

Fidejustus Walther, Schnaittenbach, Germany, assignor to Groov-Pin Corporation, a corporation of New York Application July 22, 1952, Serial No. 300,253

Claims priority, application Germany November 12, 1951

3 Claims. (Cl. 81—53)

The present invention is concerned with tools for the application more especially of self tapping screw mounting inserts into untapped bores of structures of relatively soft metal or plastic.

It is among the objects of the invention to provide a driver tool for the above purpose which is essentially of simple, rugged machined parts that are easily assembled, which is devoid of driving teeth or of springs and which may be employed in the same manner as any ordinary driver tool, but which reliably assures release from the insert upon starting to turn the driver tool in unscrewing direction, and affords such assurance, regardless how tightly the tool may have become locked to the insert in the installation operation, so that the tool may be removed without the slightest tendency to loosen, much less to unscrew, the tightly installed insert.

In the accompanying drawings in which is shown one of various possible embodiments of the several features of the invention, Fig. 1 is a fragmentary view in longitudinal cross section showing the relation of a preferred form of tool to the insert prior to installation, Fig. 2 is a cross-sectional view taken on line 2—2 of Fig. 1, Fig. 3 is a view similar to Fig. 2, taken on line 3—3 of Fig. 1, Fig. 4 is a side elevation, partly in section, showing the position of the tool in the installation and tightening of the insert, and Fig. 5 is a view similar to Fig. 4, showing the relation of the parts as the tool is being withdrawn from the installed insert.

One preferred form of insert to which the tool has particular applicability is that made the subject of U. S. Patent No. 2,455,885, issued December 7, 1948, to Erich G. Theurer. The insert in its general outline comprises a tubular member 12 of steel, preferably hardened steel, transversely slotted at 12' at its entry end across its external threads $t$ to form cutters at the advance edges of such slots for gouging the metal or plastic from the smooth generally cylindrical bore $b$ in the structure S to which the insert is to be applied, so that the insert will tap into the smooth bore a thread which is snugly conformed to thread $t$ of the insert 12 for secure accommodation in the structure S. The insert 12 is tubular in form as shown, and its bore is tapped for the purpose of accommodating the correspondingly threaded end 13 of the driver tool used in installing such insert and after removal of such tool to accommodate the screw (not shown) for which the insert is to afford a secure anchor in the soft metal or plastic structure S in which the insert is accommodated. While the insert is shown as of the headless variety, it may if desired be provided with a head such as shown in the embodiment illustrated in the patent above identified.

The driver tool shown in the drawings comprises a shank assembly A which may have a keying upper end 10 to which may be applied a suitable handle or a mechanical drive (not shown) for operating the tool.

The tool also presents a reaction stop 11 in the form of a flat end which engages the outer extremity of the insert 12 when threaded as far as it will go upon the protruding threaded end 13 which is the extremity of a threaded axial rod R adjustably affixed in the correspondingly tapped enlarged holder end 14 of the shank 15 of assembly A so that the insert cannot move relative to the shank during installation. The reaction stop 11 is at the outer preferably reduced extremity of a thrust shell 16 which encompasses the enlarged holder end 14 and through the face of which the rod R protrudes axially. Shell 16 is assembled to the shank for a limited lost motion connection thereof, in order to permit limited relative movement of said shell, both peripherally and longitudinally. To this end radiating studs, preferably a pair of opposed such studs rigidly affixed either in the enlarged end 14 of the shank assembly or in the thrust shell 16, protrude into correspondingly enlarged depressions in the other of said elements. In one desirable embodiment shown, a transverse drive pin 17 across the enlarged holder end 14 and beyond the extremity of the screw rod R, may protrude at its extremities 18 in order to provide the studs each of which projects into a short peripheral depression 19 in the inner wall of the thrust shell 16 that is larger than the corresponding protruding stud 18, both peripherally and longitudinally of the shell, as shown. Each depression has opposed end walls 20 and 21. The drive pin 17 is preferably assembled to the shell through either of two opposed apertures 22 of somewhat larger diameter that are aligned with the depressions 19.

A low-friction bearing preferably in the form of a ball bearing 23, is interposed between the holder end 14 of the operating shank and a reaction plate 24 resting on the flat face bottom 25 of the thrust shell 16.

To permit adjustment in the protruding length 13 of threaded rod R, for adaptation to inserts of different lengths, a lock nut 26 encompassed by the thrust shell 16 and about rod R, is interposed between the ball bearing 23 and the extremity of the enlarged holder end 14, access to the operating bores 27 of said lock nut being afforded by means of a short transverse slot 28 in the wall of the thrust shell 16, so that after loosening the nut 26, screw rod R may be adjusted in the shank end 14, to effect the desired protrusion, whereupon the lock nut may again be tightened and ball bearing 23 and reaction plate 24 remain loosely in place between the lock nut and the base of the thrust shell by reason of the longitudinal play between the cross pin 17 and the depressions 19.

Preferably the enlarged end 14 of the shank assembly, the lock nut 26, the ball bearing 23, and the reaction plate 24 are all of substantially the same diameter slightly smaller than the inner diameter of the encompassing thrust shell 16, as shown.

In operation, the insert 12 to be installed is first threaded upon the protruding end 13 of the screw rod R. Thereupon the insert is inserted into the mouth of the unthreaded bore. By turning the handle of shank 15, the protruding ends 18 of the cross pin 17 enter into driving engagement with the end walls 20 and with the lower surfaces of the depressions 19, to move shell 16 toward work-piece S, while the pressure against the thrust shell takes up all play between the elements 25, 24, 23 and 26. In this manner, the reaction face 11 presses against the end of the insert 12, which self-threads its way inward until it has been completely installed. Thereupon the tool is released from the insert by turning it in reverse direction. In this reverse drive, regardless how tightly the tool may have become jammed with respect to the insert in home position, it will release that insert without the slightest tendency to loosen it or carry it outward during tool release. For, at the beginning of the counterclockwise turning of the tool, the driving handle is not in driving relation to the thrust shell 16 by reason of the lost motion which must first be taken up by turning of cross pin 17 through the width and height of depression 19 to disengage wall 20 and engage wall 21 thereof, and to disengage the lower and engage the upper surface of said depression 19, before the shank can drive the thrust shell counterclockwise. At the beginning of this counterclockwise movement of the tool, the thrust shell 16 cannot moreover be driven frictionally by the positively turned shank assembly A, since the only possible driving connection between the two would be at the low-friction thrust bearing 23. Accordingly in the positive unscrewing movement of the shank assembly A, the thrust shell is at the outset driven neither through the cross pin 17 nor through the low friction thrust bearing 23. The pressure exerted upon insert 12 through thrust sleeve 16 at first prevents outward movement thereof, so that the latter cannot be screwed out at this stage of the tool withdrawal operation. By the time the lost motion has been taken up and the thrust shell 16 is positively driven, it will release the insert, since said shell has moved longitudinally. By then the rod R will have been moved outward from the insert to assure its release, so that the tool is unscrewed and removed without further difficulty, while the insert remains firmly installed.

It will be seen that the tool involves nothing more than a few machined parts that are easily assembled and is devoid of any driving tooth formation or of any springs subject to fatigue and that it is assembled with the greatest of ease.

As many changes could be made in the above construction and many apparently widely different embodiments of this invention could be made without departing from the scope of the claims, it is intended that all matter contained in the above description, or shown in the accompanying drawings, shall be interpreted as illustrative and not in a limiting sense.

Having thus described my invention what I claim as new and desire to secure by Letters Patent of the United States is:

1. A quick release driver tool for the application of a self tapping screw mounting insert into an untapped bore in metal or the like, said tool comprising a shank assembly including a shank member and having a threaded end extending from and rigid therewith for releasable screw mount of a threaded insert thereon, a thrust shell about said shank assembly having an end for engagement with such insert, said thrust shell having a bore and a counterbore, thereby forming a shoulder within the shell, a driving connection between said shank assembly and said shell having lost motion in both rotational and longitudinal directions, said lost motion connection comprising one or more rigidly affixed radial studs protruding from one of said shank assembly and shell with depressions in the other of said elements that accommodate said studs, and a low friction thrust bearing about said threaded end lying in abutting relation with the shank member on one side and with the shoulder within the shell on the other side.

2. The combination recited in claim 1 in which the threaded end is provided on an axial rod adjustable with respect to the rest of the shank assembly of the end thereof that protrudes beyond the thrust shell so that the end of the axial rod protruding beyond the end of the thrust shell can be related to the length of insert to be applied, said shank member including a lock nut about the threaded axial rod and abutting against the low friction thrust bearing, and the shell having an opening affording access to said lock nut for adjustment thereof.

3. The combination recited in claim 1 in which the threaded end is at the extremity of a threaded rod, the shank member has an enlarged end, a lock nut threaded on the rod and abutting said enlarged end and which in turn is abutted by the low friction thrust bearing which is in the form of a ball bearing, the diameter of said enlarged end, said lock nut and said low-friction bearing being slightly less than the counterbore of the thrust shell, and said shell end being of reduced diameter for engagement with the insert to be applied.

References Cited in the file of this patent
UNITED STATES PATENTS

| | | |
|---|---|---|
| 2,263,871 | Duffy | Nov. 25, 1941 |
| 2,458,622 | Miller | Jan. 11, 1949 |
| 2,550,866 | Rosan | May 1, 1951 |